(No Model.)
M. W. KOUNS.
DISK HARROW.
No. 580,408. Patented Apr. 13, 1897.
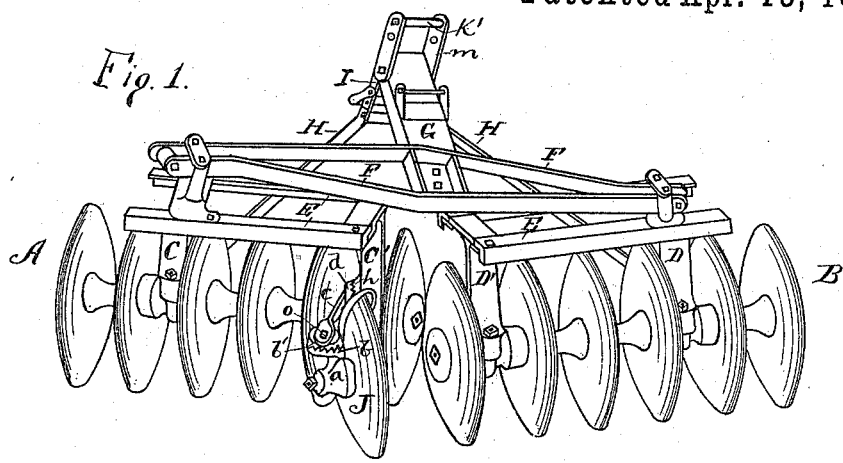
Fig. 1.
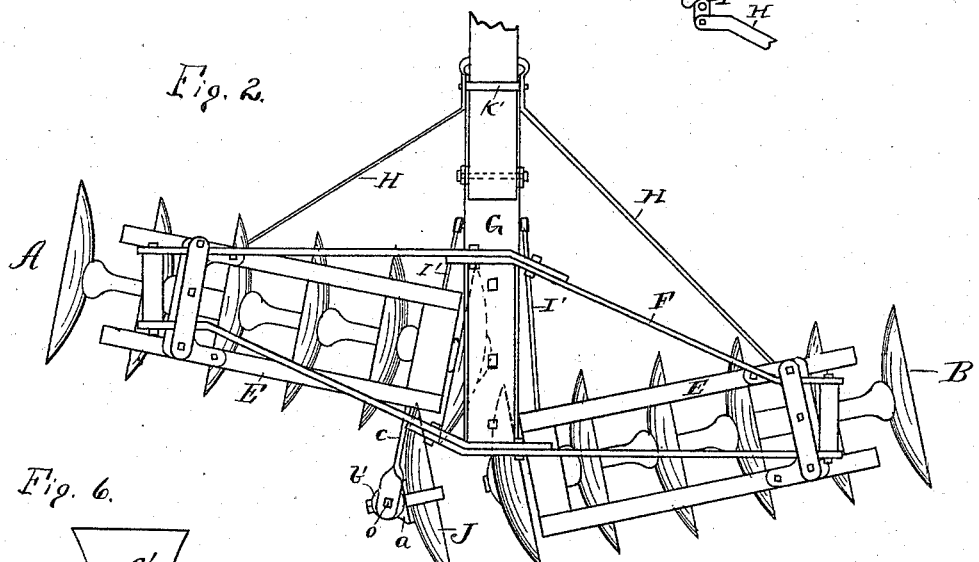
Fig. 2.
Fig. 5.
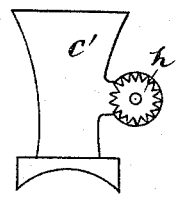
Fig. 6.
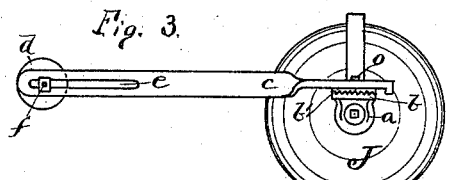
Fig. 3.
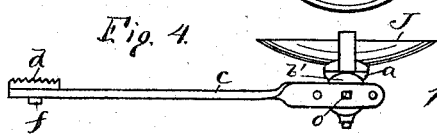
Fig. 4.
WITNESSES:
L. L. Allen
W. W. K. Hamilton
INVENTOR:
M. W. Kouns.
By R. J. McCarty,
his ATTORNEY.

UNITED STATES PATENT OFFICE.

MOSES W. KOUNS, OF DAYTON, OHIO, ASSIGNOR TO THE OHIO CULTIVATOR COMPANY, OF BELLEVUE, OHIO.

DISK HARROW.

SPECIFICATION forming part of Letters Patent No. 580,408, dated April 13, 1897.

Application filed August 6, 1896. Serial No. 601,874. (No model.)

*To all whom it may concern:*

Be it known that I, MOSES W. KOUNS, a citizen of the United States, residing at Dayton, in the county of Montgomery and State of Ohio, have invented certain new and useful Improvements in Disk Harrows; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to disk harrows. The essential feature is in a combination of the two disk gangs, one in advance of the other at their inner ends, and an auxiliary disk essentially in the space between the two inner disks of the foremost gang and behind the same and organized to take up more or less of the loose soil left by the inner disk of the front gang and to throw that soil into the furrows left by the two inner disks of both gangs, so as to practically level off the surface over which said two inner disks have passed and yet to fully cultivate the same; and a second feature of my invention is to provide for adjusting the vertical position of this auxiliary disk so as to vary the depth of its cut relatively to the depth of the cut of the gang-disks and to change or adjust the position of the auxiliary disk relatively to the angle of the gangs, so that under any and all conditions the auxiliary disk will leave a practically level surface in all kinds of soil.

In the accompanying drawings, forming a part of this specification and on which like reference-letters indicate corresponding parts, Figure 1 is a rear elevation of a harrow having my improvements thereon. Fig. 2 is a top plan view. Figs. 3 and 4 are a side and top view, respectively, of the auxiliary disk. Fig. 5 is a side elevation of the tongue-clevis and the inner end of the tongue, parts being broken away. Fig. 6 is a detached view of the gang-hanger upon which the auxiliary disk is mounted.

The gangs consist of the usual series of disks A B, the shafts of which have bearings in hangers C C' and D D', depending from the gang-beams E, which have a pivotal connection with the frame F, constructed of angle-iron and mounted on the draft-beam G. The gangs are preferably mounted so that one will be from ten to twelve inches in the rear of the other. This allows their being brought sufficiently close at their inner ends to insure action upon the soil between the inner disks. The hounds or draft-rods H H are connected to the outer gang-hangers C and D and to the lower end of the adjustable hitch or clevis I. The angling-bars I' I' are connected to the inner hangers and to the lower ends of the hand-levers (not shown) and are manipulated in the usual manner.

J designates the auxiliary or side-throwing disk, the hub $a$ of which has a serrated or toothed ledge $b$, which engages with a similar part $b'$. The latter is independent of, but adjustably secured to, an arm $c$ by means of a clamping-bolt $o$.

$d$ is a toothed or serrated plate mounted on the inner end of said arm by means of a clamping-bolt $f$, that penetrates a slot $e$ in said arm. This plate $d$ engages with a similar toothed surface $h$ on the side of the gang-hanger $C'$ and is made secure thereto by a clamping-bolt $f$. The serrated plates or parts $b'$ and $d$ are movable or adjustable in a circle by loosening the clamping-bolts $o$ and $f$. The adjustment that may be thus given the disk J is lateral or horizontal to the plane of the gangs, while that which may be imparted to the arm $c$ is longitudinal and vertical and is for regulating the contact of the auxiliary disk with the ground. The position of said disk relative to the inner gang or the length of the arm $c$ may be adjusted and made permanent by means of the slot $e$ and clamping-bolt $f$.

The disk J is equally adapted to an attachment with either of the gangs. As shown in Fig. 2, the angle of the auxiliary disk coincides with that of the rear gang. In this position the said disk will leave a level surface and does not interfere with the gangs being brought the desired distance apart to avoid the effect of the side thrust upon the gangs, which is damaging when the gangs are wide apart. The tongue, which is not shown, is flexibly connected to the clevis $k$, and its play may be regulated by changing the pin $k'$ in the clevis $m$ higher or lower, as the case may require. Thus I have provided an organization by which more or less of the loose soil left by the inner disk of the forward gang is taken up by the auxiliary disk and thrown over into the furrows left by the innermost disks of both gangs, so as to practically level up the space or strip of land between the inner disks of both gangs, notwithstanding the said strip of land is cultivated by said inner disks. The user will adjust the angle of the auxiliary disk relatively to the angle of the gangs to suit the soil and particular work he desires to do, and will also vertically adjust the auxiliary disk to vary the depth of its operations in comparison with the depth of cut made by the gangs themselves.

Having described my invention, I claim—

1. In a disk harrow in which the inner ends of the gangs are arranged one in advance of the other, the combination with the foremost one of said gangs, of an auxiliary disk mounted on said foremost gang and projected in the rear thereof, the position of said disk being essentially in the rear of the space between the two extreme inner disks of said foremost gang, substantially as and for the purpose specified.

2. In a disk harrow in which the gangs are placed one in advance of the other, the combination with the foremost gang, of an auxiliary disk projected in the rear of said foremost gang and in line with the space between the two extreme inner disks of said gang, an arm upon which said auxiliary disk is mounted, the said arm being provided with a longitudinal slot on its inner end, and a ratchet-plate engaging with similar means on the inner standard of said foremost gang, whereby both a horizontal adjustment from or toward said gang, and a vertical adjustment of said auxiliary disk may be obtained, substantially as described.

In testimony whereof I affix my signature in presence of two witnesses.

MOSES W. KOUNS.

Witnesses:
R. J. McCARTY,
L. L. ALLEN.